(12) United States Patent
Krawczyk

(10) Patent No.: US 9,045,923 B2
(45) Date of Patent: Jun. 2, 2015

(54) AUTOMATED STORAGE RACK AND STORAGE PRODUCT CARRIER WITH ACCESS CONTROL

(75) Inventor: Dariusz Krawczyk, Cracow (PL)

(73) Assignees: Hänel & Co., Altstätten (CH); ISL SP, Z O. O., Cracow (PL)

( * ) Notice: Subject to any disclaimer, the term of this patent is extended or adjusted under 35 U.S.C. 154(b) by 567 days.

(21) Appl. No.: 13/089,638

(22) Filed: Apr. 19, 2011

(65) Prior Publication Data

US 2012/0267990 A1 Oct. 25, 2012

(51) Int. Cl.
*G06F 7/00* (2006.01)
*E05C 19/16* (2006.01)
*E05B 47/02* (2006.01)
*E05B 65/02* (2006.01)
*B65G 1/137* (2006.01)

(52) U.S. Cl.
CPC .............. *E05C 19/166* (2013.01); *E05B 47/02* (2013.01); *E05B 65/025* (2013.01); *B65G 1/137* (2013.01)

(58) Field of Classification Search
USPC ........................................................ 700/215
See application file for complete search history.

(56) References Cited

U.S. PATENT DOCUMENTS

| | | | | | |
|---|---|---|---|---|---|
| 4,317,604 | A | * | 3/1982 | Krakauer | 312/97.1 |
| 2002/0177922 | A1 | * | 11/2002 | Bloom | 700/213 |
| 2003/0001466 | A1 | * | 1/2003 | Herrington | 312/215 |
| 2008/0237167 | A1 | * | 10/2008 | Hanel | 211/183 |
| 2011/0140831 | A1 | * | 6/2011 | Michael | 340/3.31 |
| 2013/0113344 | A1 | * | 5/2013 | Elwell | 312/215 |

FOREIGN PATENT DOCUMENTS

PL 15739 11/2010

* cited by examiner

*Primary Examiner* — Gene Crawford
*Assistant Examiner* — Kyle Logan
(74) *Attorney, Agent, or Firm* — Brian B. Shaw, Esq.; Timothy W. Menasco, Esq.; Harter Secrest & Emery LLP

(57) ABSTRACT

A storage product carrier for a storage rack includes a plurality of carrier supports spaced one above the other, arranged in pairs on opposite side walls of the storage rack and able to support the storage product carrier which is conveyable by an automatic storage/retrieval device and an access opening for accessing the storage product carriers has a plurality of compartments having openings. A closure is provided to cover at least one of the openings, wherein a locking mechanism is provided to lock the closure of the associated openings and wherein the locking mechanism can be controlled to lock the closure in a closed position or an open position such that the compartment becomes accessible.

15 Claims, 5 Drawing Sheets

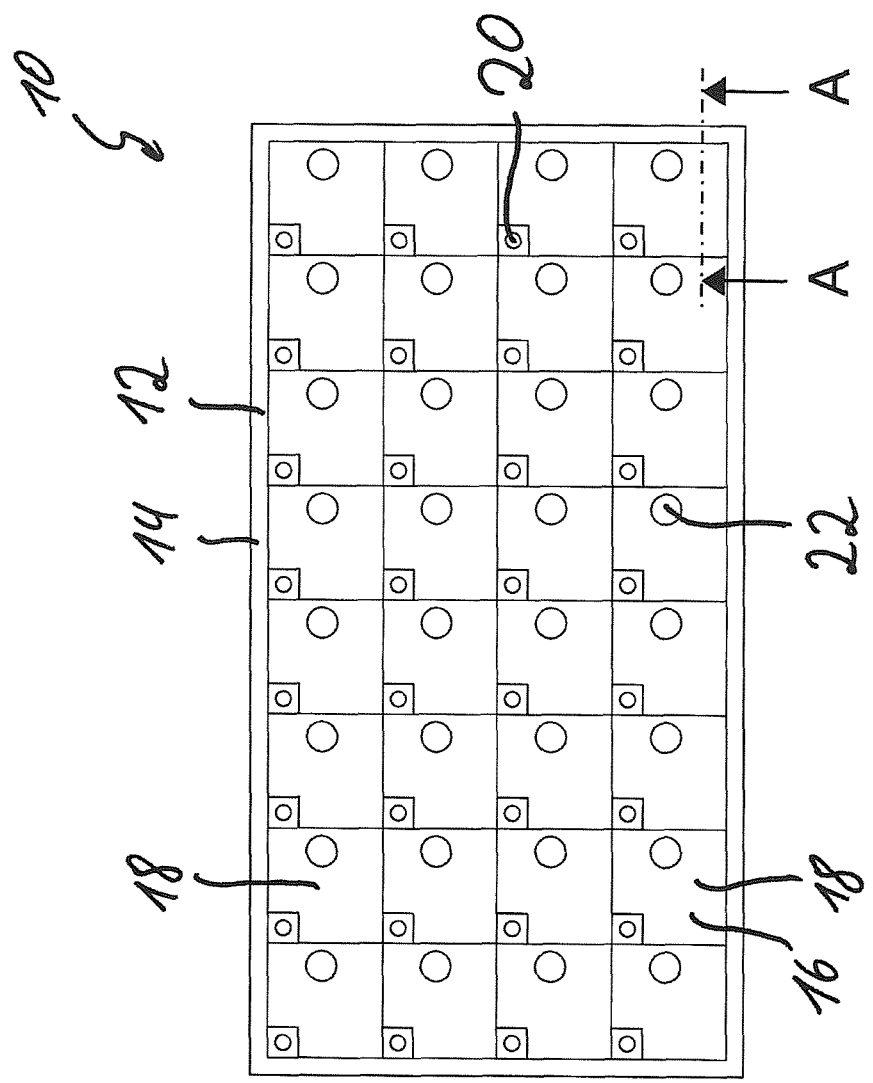

AUTOMATED STORAGE RACK AND STORAGE PRODUCT CARRIER WITH ACCESS CONTROL

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING"

Not applicable.

BACKGROUND OF THE INVENTION

1. Field of the Invention

The present disclosure relates to a storage assembly having a storage product carrier for a storage rack comprising a plurality of carrier supports spaced one above the other, arranged in pairs on opposite side walls of the storage rack and able to support the storage product carrier which is conveyable by means of an automatic storage/retrieval device and an access opening for accessing the storage product carriers, wherein the storage product carrier is provided with a multitude of compartments having openings.

2. Description of Related Art

Storage product carriers are widely in use in storage racks also known as storage lifts. In such lifts, many storage product carriers are stored, often arranged one above the other in storage towers. The plurality of carrier supports allows the system to store the product carriers using just as much room as needed. To that end, the height of the stored goods in the storage product carriers is measured before storage. In function of the measured height, storage room is allocated to each storage product carrier.

As the storage product carriers often are quite large—two or more meters in depth and five meters in width are not rare—they are often divided into compartments, each of which provides space for storage products. As an example, each compartment may hold a quantity of a different type of screw.

If a user of the storage product carrier picks item from the compartments and, in the process, erroneously picks the wrong items, there may be dire consequences. In one example case, parts for machinery which are not correct and which break the machinery later on can be chosen. Another example includes parts that are similar and thus stored next to each other but have a large difference in price. If the wrong part is picked, either customer dissatisfaction or monetary loss ensues. In addition, in those instances involving medications, picking the wrong medication may lead to serious complications.

BRIEF SUMMARY OF THE INVENTION

The present system is based on the problem of providing a storage product carrier of the kind mentioned above which allows improved access control. Furthermore, an automated storage rack providing increased access control is provided.

As a solution, it is proposed to provide the storage product carrier mentioned in the introduction with a closure, such as closing means to cover at least one of the openings such that the contents of the compartment becomes physically inaccessible, wherein a locking device is provided to lock the closing means in the opening and wherein the locking device can be controlled to allow the closing means to be moved such that the opening becomes accessible.

The proposed storage product carrier will only allow access to certain compartments if it is being controlled to do so, for example when an authorized user wishes to access one of the covered compartments.

Each of the closures, such as closing means may comprise a locking device that can be locked independently from the other closing means or devices. That way, each of the compartments can have different access profiles.

One closure, such as closing means may be provided for each compartment. That way, access control is provided for all compartments and each of the compartments is separately accessible.

The locking device may be configured to be controlled remotely. Users' access rights may thus be stored in a central component, for example a control device of the storage rack.

In another embodiment, the locking device comprises a magnetic and/or a mechanical lock. These types of locks offer secure locking as well as fast unlocking capabilities.

The closure or closing means may comprise an inspection opening. This way, the user may, without opening the compartment or even possessing access rights to do so, determine whether the compartment is filled or not.

The closure or closing means may comprise a handle or handle section which makes it easier for the user to open the closing means once it is unlocked.

Furthermore, the closure or closing means may be provided with an indicator. As has been said above, the storage product carriers may be very large, so that finding the compartment which has just been opened may be difficult for the user. By providing an indicator, in particular a visual indicator, the user can recognize in an instant which compartments they may open. The indicator may also be useful in assisted picking.

The compartment and/or the closing means may comprise a detector for detecting a position of the closing means. That way, a user may receive information about closing means which have not been closed correctly. Since the function of most locking devices depends on the closing means being properly closed, the main cause of failure of the locking device to lock the closing means in the opening is detected.

The storage product carrier may comprise connection means for connecting a current supply and/or a signal transmission device. The connection means may be partly or entirely wireless.

The storage product carrier may comprise a control and interface device for controlling locking devices. This simplifies the connection means because it is no longer necessary to provide a connection means for each locking device. All control signals may be directed at the control and interface device which then is responsible for controlling the locking devices, indicators and detectors.

An automated storage rack according to the present disclosure comprises the storage product carrier which allows a user to define access rights for the compartments and not only for entire carriers.

The automated storage rack may comprise a computing device which in turn comprises an input means, an output means, an interface for interfacing with a storage product carrier and a stored parts memory associating compartments with stored parts and access rights.

BRIEF DESCRIPTION OF THE SEVERAL VIEWS OF THE DRAWING(S)

FIG. 1 is a top view of a storage product carrier according to the invention.

DETAILED DESCRIPTION OF THE INVENTION

Figure 2A:
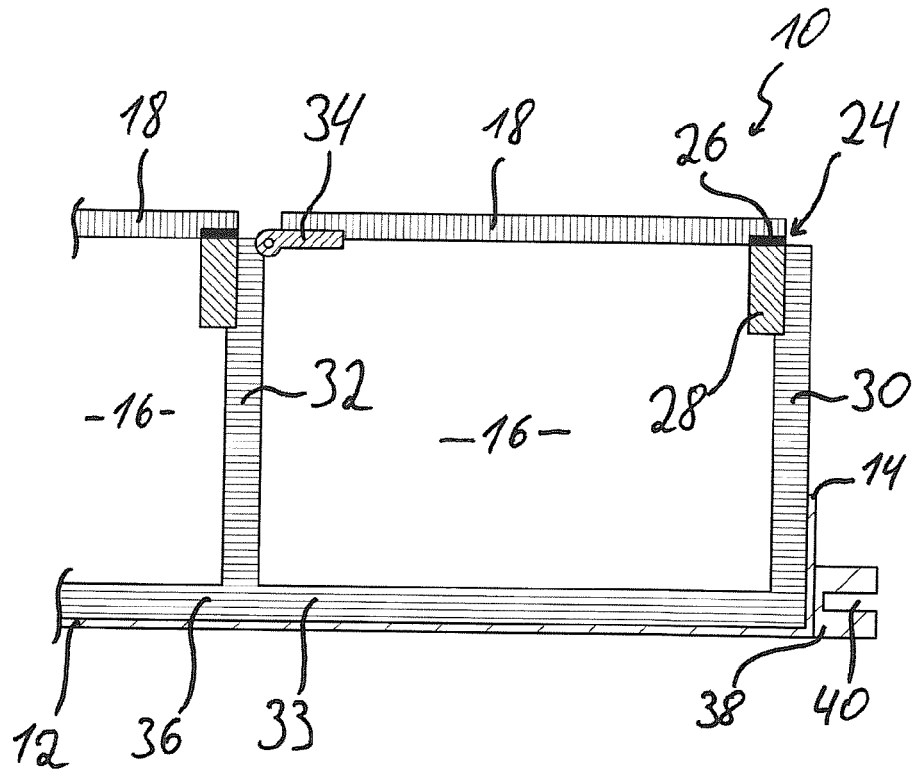
FIG. 2a is a cross-section along the line A-A in FIG. 1 of an embodiment with a magnetic lock.

A storage product carrier 10 as shown in FIG. 1 has a base portion 12 of which only a border 14 is visible in the drawing. A plurality of compartments 16 is arranged in a rectangular pattern.

Each of the compartments 16 is covered by a closure, such as closing means which, in one embodiment, is a lid 18. Each of the lids 18 has an indicator in the form of an LED 20 which will light up when the lid 18 is, for example, unlocked.

Furthermore, the lid 18 has an opening 22 which at the same time serves as an inspection opening and a handle section. The opening 22 allows the user to visually inspect the contents of the compartments 16. When the lid 18 is unlocked, the user may put a finger through the opening 22 and use it as a handle to pull up the lid 18.

If storage goods which are to be stored in the compartment 16 are small enough to be removed from the compartment 16 through the opening 22, the opening 22 can be covered by a transparent or translucent window and a separate handle for opening the lid 18 may be provided.

As shown in FIG. 2a, the compartments 16 are formed by a main body 36 and are bordered by walls 30, 32 and a floor 36.

The compartment 16 and the lid 18 can include a lock such as locking means 24 including magnetic locking means. The magnetic locking means comprises a ferromagnetic metal tablet 26 which is affixed solidly to the closing means, such as the lid 18. Furthermore, the magnetic locking means comprises a solenoid 28 affixed solidly to the wall 30 of the compartment 16. The solenoid 28 is wound around a core (not shown) that comprises a permanent magnet. Thus, if the solenoid 28 does not receive any energy, the permanent magnet contained within will hold the magnetic metal tablet 26 firmly in place and, in this way, will lock the lid 18.

When the solenoid 28 receives electric power, it will counter the magnetic field of the permanent magnet contained within in such a way that the metal tablet 26 may be removed from the solenoid 28. In this way, the lid 18 is unlocked. This kind of lock has no moving parts and is almost maintenance-free. The current through the solenoid 28 must be in the right direction for the magnetic field caused by it to counter the magnetic field of the permanent magnet.

Figure 2B:
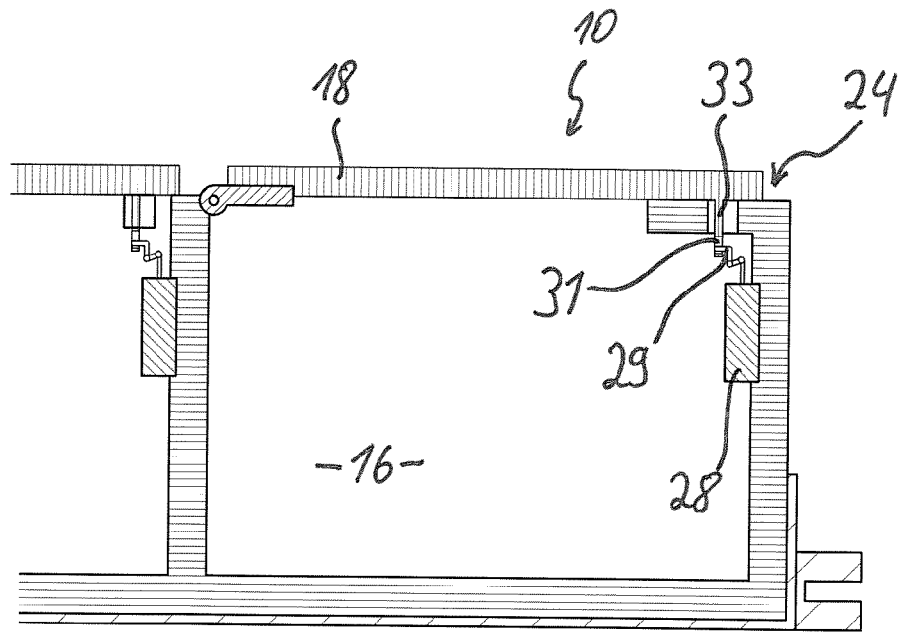
FIG. 2b is a cross-section along the line A-A in FIG. 1 of an embodiment with an electromagnetic lock.

However, if the goods to be stored in the compartment 16 are sensitive to magnetic fields, a different solution may be required, which is shown in FIG. 2b. It is possible to provide locking means 24 which also has a mechanical locking component. One example would be a hook 29 which is hooked into an opening 31 of a leg 33 of the lid 18 and which can be withdrawn by the solenoid 28. The solution would only require very low-strength magnetic fields.

Further choices for locking means 24 may be envisaged by a person skilled in the art and the locking means are not restricted to the types described above.

As can further be seen in FIG. 2, the lid 18 is connected to the wall 32 by a hinge 34. The hinge 34 holds the lid 18 in place, so that it can be opened and closed easily, thus moving between an open position and a closed position. Furthermore, the hinge 34 can contain a position detector (not shown) capable of emitting a signal when the lid 18 is not fully closed (or in a predetermined position).

The main body 36 is laid into the base portion 12 and is surrounded at least partly by the border 14. The base portion 12 has a support rail 38 with a groove 40 into which carrier supports of a storage rack may be inserted.

Figure 3:
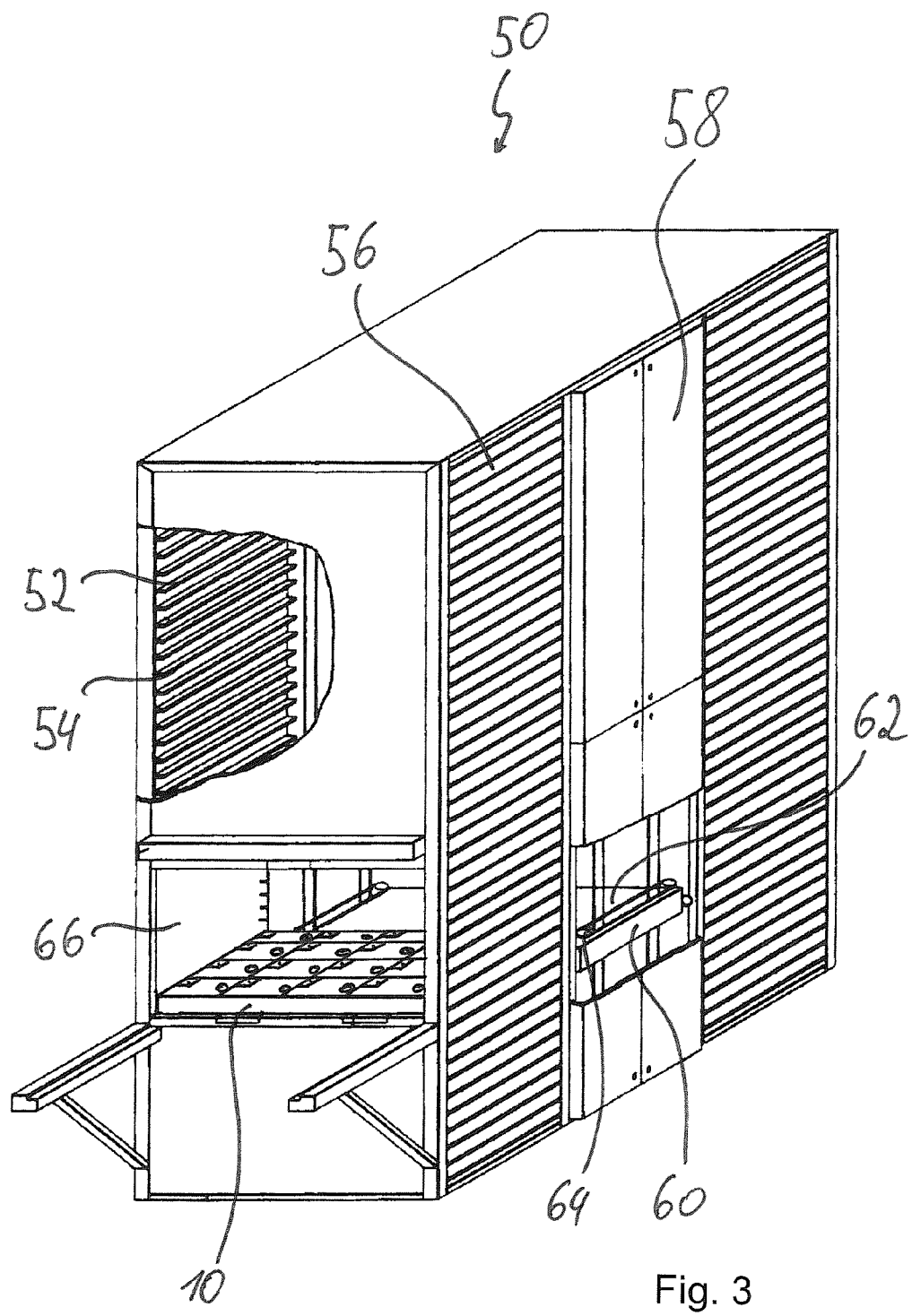
FIG. 3 is a view of an automated storage rack according to the invention.
Figure 4:
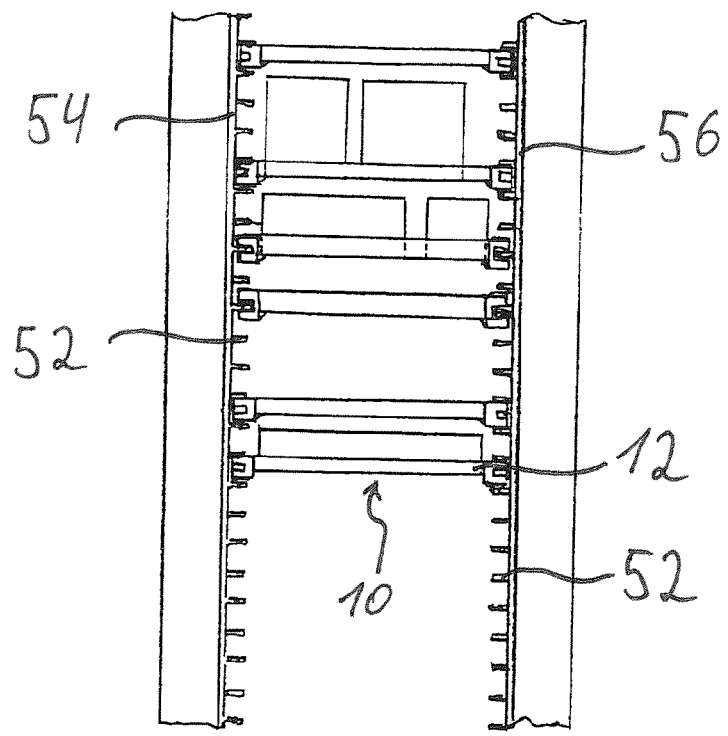
FIG. 4 is an internal view of an automated storage rack as in FIG. 3.

A storage rack 50 suitable for accepting the storage product carrier 10 is shown in FIGS. 3 and 4. Carrier supports 52 are arranged on side walls 54, 56 of the storage rack 50. A lift compartment 58 contains an automatic storage/retrieval device, in this case a lift 60 with a platform 62 and a handling device 64 for drawing the storage product carrier 10 onto the platform 62 and for pushing it either into an access opening 66 or onto a pair of carrier supports 52.

Figure 5:
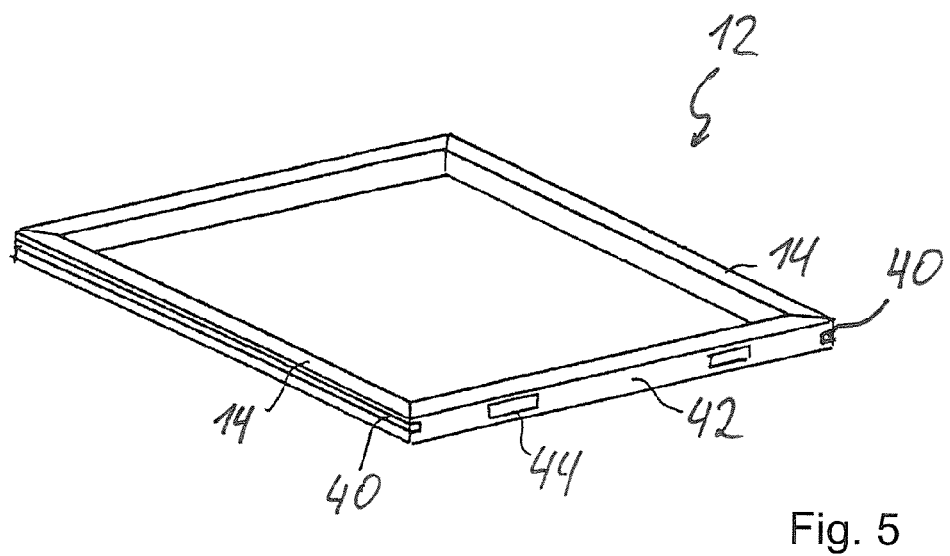
FIG. 5 is a view of a base section of a storage product carrier according to the invention.

The base portion 12 without the main body 36 and the lids 18 is shown in FIG. 5. A front portion 42 of the base portion 12 has recesses or openings 44 which allow for the handling device 64 to grip the base portion 12 and thus draw it out from the carrier supports inserted into the grooves 40.

Figure 6:
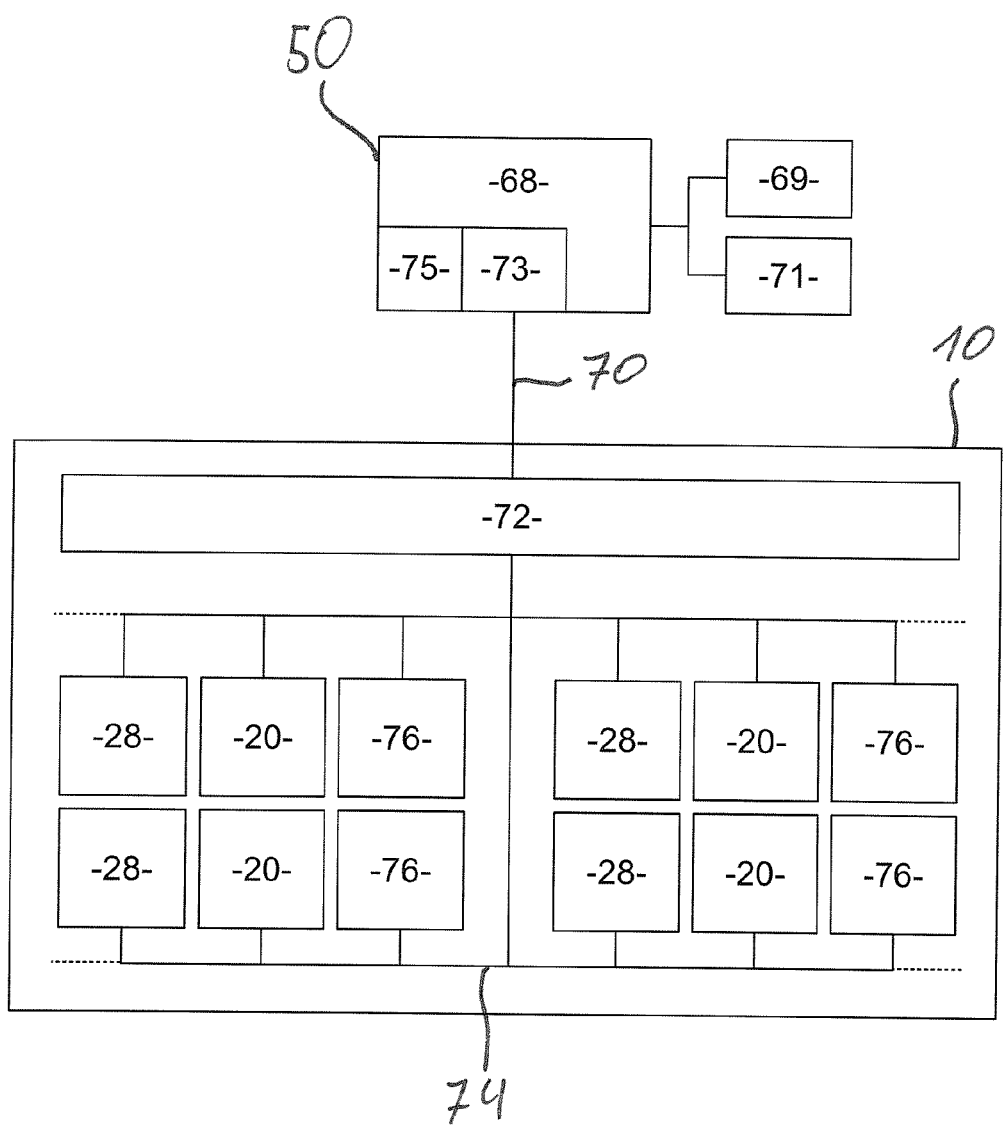
FIG. 6 is a functional schematic of an automated storage rack and a storage product carrier according to the invention.

As is shown in the signal schematic in FIG. 6, the storage rack 50 includes a control unit 68 which, among other tasks, keeps track of all the goods deposited in storage product carriers 10, especially which compartment 16 on which storage product carrier 10 the goods were deposited in. Furthermore, the control unit 68 grants access to the storage rack 50 and the storage product carriers 10 based on identification given by a user. If the user does not have access rights to a certain storage product carrier 10, that storage product carrier 10 will not be moved into the access opening 66 by the lift 60 and handling device 64.

To interface with the user, the control unit 68 has an input such as input means, in this case a keyboard 69, and an output such as output means, in this case a monitor 71. Further input and/or output means may be provided, for example RFID identification for users.

To that end, the control unit 68 comprises a stored parts memory 75 which also holds a list of goods and an identification of compartments 16 these goods are stored in. Also, access control information for the compartments 16 is stored in the stored parts memory 75.

Once the user has requested a storage product carrier 10 that they have access to, the storage product carrier 10 will be moved into the access opening 66. The storage product carrier 10 is connected to an interface 73 of the control unit 68 by the connection means 70 which in this embodiment is an infrared communication unit. Mechanical spring contacts are provided to the storage product carrier 10 for power supply (not shown).

The control unit 68 then establishes a connection to a control and interface device 72 of the storage product carrier 10. Once the connection has been established, the control unit 68 transmits to the control and interface device 72 the identification of all compartments 16 that the user shall be allowed to open.

The control interface device 72 emits signals on and receives signals from a signal bus 74. The LEDs 20, the solenoid 28 and detectors 76 of all the compartments 16 have interfaces connected to the signal bus 74. By this connection, it is possible for the control interface device 72 to command the solenoid 28, the LEDs 20 and to read out the detectors 76.

Once the control interface device 72 has received the identification of the compartments 16 that are to be unlocked, it sends a command to the solenoids 28 of the selected compartments 16 to unlock. Furthermore, the control interface device 72 sends a command to the appropriate LEDs 20 to turn themselves on so as to indicate the compartments 16 that may be opened by the user. Of course, it may be possible that only one compartment 16 may be opened by the user.

When one of the compartments 16 is opened by the user, the detectors 76 send a signal to the control interface device 72 which in turn transmits the signal to the control unit 68. The control unit 68 may or may not supervise the opening and closing of compartments 16. One example where supervision may be useful is the automatic updating of a number of parts stored in the compartments 16.

Once the user has finished picking from the storage product carrier 10, the user will command the control unit 68 to move the storage product carrier 10 back into storage. When this happens, the control and interface device 72 will verify that all the detectors 76 report that their associated lid 18 has been closed. If this is not the case, the control and interface device 72 will transmit a message to the control unit 68 which will in turn display an information message on the monitor 71. Furthermore, the control interface device will command the LEDs 20 of the compartments 16 the lids 18 of which are not properly closed to flash. Once all the lids 18 have been properly closed, the control unit 68 will command the lift 60 and handling device 64 to move the storage product carrier 10 back into storage space.

Although the compartments 16 shown in FIG. 1 are all square and of the same size, the compartments 16 can be of any shape, for example rectangular or hexagonal. It is not necessary for all the compartments 16 to be covered by the lid 18.

The storage product carrier and the automated storage rack proposed herein allow for easy and secure access control to compartments 16.

The invention claimed is:

1. A storage assembly comprising:
(a) a storage product carrier including a plurality of compartments, each compartment having (i) at least one corresponding opening and (ii) closing means for covering at least one corresponding opening, wherein each compartment does not span a full length or width of the storage product carrier and wherein at least one closing means is provided for each compartment;
(b) a storage rack including a plurality of carrier supports spaced one above the other, arranged in pairs on opposite side walls of the storage rack and are able to support the storage product carrier; and
(c) locking means for selectively locking the closing means, wherein the locking means can be controlled to lock the closing means in the opening or to allow the closing means to be moved such that the at least one corresponding opening becomes accessible.

2. The storage assembly of claim 1, wherein the locking means for each compartment can be controlled independently from other locking means.

3. The storage assembly of claim 1, wherein the locking means is configured to be controlled remotely.

4. The storage assembly of claim 1, wherein in that the locking means includes at least one of a magnetic lock and a mechanical lock.

5. The storage assembly of claim 1, wherein the closing means includes an inspection opening.

6. The storage assembly of claim 1, wherein the closing means includes a handle section.

7. The storage assembly of claim 1, wherein the closing means includes an indicator.

8. The storage assembly of claim 1, wherein one of the compartment and the closing means includes a detector for detecting a position of the closing means.

9. The storage assembly of claim 1, further comprising a control and interface for controlling the locking means.

10. The storage assembly of claim 1, further comprising a computing device having an input, an output, an interface for interfacing with the storage product carrier and a stored parts memory associating compartments with stored parts and access rights.

11. The storage assembly of claim 1, wherein the storage product carrier is configured to be conveyable by means of an automatic storage/retrieval device.

12. The storage assembly of claim 1, wherein the storage rack includes an access opening for accessing the storage product carrier.

13. The storage assembly of claim 1, wherein the storage product carrier includes connection means for connecting at least one of a current supply and a signal transmission device.

14. The storage assembly of claim 13, wherein the connection means is at least partly wireless.

15. The storage assembly of claim 13, wherein the connection means is infrared.

* * * * *